US008838045B2

(12) United States Patent
Caron et al.

(10) Patent No.: US 8,838,045 B2
(45) Date of Patent: Sep. 16, 2014

(54) SUB-BAND DUPLEXER WITH ACTIVE FREQUENCY TUNING (75) Inventors: Joshua J. Caron, Madison, NC (US); Julio Costa, Oak Ridge, NC (US); Todd Gillenwater, Summerfield, NC (US)

(73) Assignee: RF Micro Devices, Inc., Greensboro, NC (US)

(*) Notice: Subject to any disclaimer, the term of this patent is extended or adjusted under 35 U.S.C. 154(b) by 602 days.

(21) Appl. No.: 12/959,512

(22) Filed: Dec. 3, 2010

(65) Prior Publication Data
US 2011/0299432 A1 Dec. 8, 2011

Related U.S. Application Data (60) Provisional application No. 61/266,402, filed on Dec. 3, 2009, provisional application No. 61/297,172, filed on Jan. 21, 2010.

(51) Int. Cl.
*H04B 1/44* (2006.01)
*H04B 1/04* (2006.01)
*H04B 1/18* (2006.01)
*H04B 1/52* (2006.01)

(52) U.S. Cl.
CPC .................................. *H04B 1/52* (2013.01)
USPC ................... 455/83; 455/79; 455/80; 455/81; 455/82; 455/73

(58) Field of Classification Search
CPC ........ H04B 1/406; H04B 1/0057; H04B 1/38; H04B 1/525; H04B 1/123; H03F 1/565; H04W 36/08; H03H 7/46; H03H 9/725; H03H 9/6483; H03H 9/706; H03J 5/248; H04J 3/0688; H01S 7/034; G06F 13/387
USPC .............. 370/277; 455/78–83, 121–123, 125, 455/280–294, 307; 375/295
See application file for complete search history.

(56) References Cited

U.S. PATENT DOCUMENTS

| 4,628,537 | A  | * | 12/1986 | Shimakata et al. | ........... 455/516 |
| 5,386,203 | A  |   | 1/1995  | Ishihara         |                     |
| 5,768,691 | A  |   | 6/1998  | Matero et al.    |                     |
| 7,142,884 | B2 |   | 11/2006 | Hagn             |                     |
| 7,570,973 | B1 |   | 8/2009  | Bienek et al.    |                     |
| 7,664,475 | B2 |   | 2/2010  | Ichihara         |                     |
| 8,072,297 | B2 |   | 12/2011 | Toncich et al.   |                     |
| 2007/0030096 | A1 | * | 2/2007 | Nishihara et al. | ............. 333/133 |
| 2007/0058748 | A1 | * | 3/2007 | Kim et al.       | ..................... 375/295 |

(Continued)

OTHER PUBLICATIONS

Lakin, K. M. et al., "Wide Bandwidth Thin Film BAW Filters," 2004 IEEE Ultrasonics Symposium Proceedings, Aug. 2004, vol. 1, pp. 407-410.

Non-Final Office Action for U.S. Appl. No. 13/372,080, mailed Jun. 28, 2013, 8 pages.

(Continued)

*Primary Examiner* — Edward Urban
*Assistant Examiner* — Max Mathew
(74) *Attorney, Agent, or Firm* — Withrow & Terranova, P.L.L.C.

(57) ABSTRACT

Embodiments disclosed herein relate to programmable duplexers. The frequency pass band of the programmable duplexer is changed according to a selection of a channel-pair selection to control or maximize the transition band between the receiver path and the transmitter path. The programmable duplexer permits selections of desired pass bands without the need for multiple duplexer filters. As an additional advantage, the transmission band requirements become less sensitive to manufacturing tolerances and temperature variations.

20 Claims, 11 Drawing Sheets

(56) References Cited

U.S. PATENT DOCUMENTS

| | | |
|---|---|---|
| 2009/0323856 A1 | 12/2009 | McCallister |
| 2009/0325564 A1* | 12/2009 | Bienek et al. ............ 455/418 |
| 2010/0144288 A1 | 6/2010 | Walley et al. |
| 2010/0231324 A1 | 9/2010 | Lee et al. |
| 2010/0321130 A1 | 12/2010 | Kim et al. |

OTHER PUBLICATIONS

Notice of Allowance for U.S. Appl. No. 12/843,574, mailed Nov. 21, 2013, 10 pages.
Final Office Action for U.S. Appl. No. 13/372,080, mailed Nov. 15, 2013, 25 pages.
Non-Final Office Action for U.S. Appl. No. 13/372,080, mailed May 16, 2014, 23 pages.

* cited by examiner

SUB-BAND DUPLEXER WITH ACTIVE FREQUENCY TUNING

RELATED APPLICATIONS

This application claims the benefit of provisional patent application Nos. 61/266,402, filed Dec. 3, 2009, and 61/297,172, filed Jan. 21, 2010, the disclosures of which are incorporated herein by reference in their entirety.

FIELD OF THE DISCLOSURE

The embodiments described herein relate to duplexers used in the frontend circuitry of communication devices. More particularly, the embodiments relate to real-time programmable duplexers.

BACKGROUND

Duplexers are an essential part of 3G cellular communication handsets. The overall purpose of a duplexer is to allow both the transmit (TX) and receive (RX) portions of a cellular radio to share a common antenna (ANT). Typically, a duplexer is a passive device with three ports: (1) a transmit port that connects to the output of the power amplifier (PA) stage of the radio, (2) a receive port that connects to the input of the low-noise-amplifier (LNA) receive stage of the radio, and (3) an antenna port which connects directly to the handset's antenna.

At present, surface acoustic wave (SAW) technology is the most ubiquitous for cellular handset duplexer applications. However, the requirements for some communications standards (notably 3G-PP Bands 2, 3, and 8) are extremely difficult or impossible to meet with standard SAW devices. The problem with respect to these bands is the very narrow frequency separation between the transmission and receiver bands.

This separation in frequency is usually referred to as the "transition band." The steepness of the filters in this region is proportional to their quality factor (Q). Even SAW filter having Qs in the neighborhood of 300-500 cannot meet the rigorous requirements of the aforementioned 3GPP bands. Not only do those bands require very narrow transition bands, the problem is exacerbated by the necessary addition of margins for manufacturing and temperature variations.

Thus, there is a need for an improved duplexer that can meet the requirements of the 3GPP bands.

SUMMARY

Embodiments disclosed in the detailed description relate to programmable duplexers. The frequency pass band of the duplexer is changed according to a selection of a channel pair selection to control or maximize the transition band between the receiver path and the transmitter path. The programmable duplexer permits selections of desired pass bands without the need for multiple duplexer filters. As an additional advantage, the transmission band requirements become less sensitive to manufacturing tolerances and temperature variations.

An exemplary embodiment of a duplexer for a communication device includes a receiver path. The receiver path may include a programmable receiver filter that provides a programmable receiver pass band. In addition, the duplexer includes a transmitter path including a programmable transmitter filter that provides a programmable transmitter pass band. The programmable transmitter filter may be separated from the programmable receiver filter by a transition band, where the programmable receiver pass band has an edge adjacent to the transition band, and the programmable transmitter pass band has an edge adjacent to the transition band. A controller may be configured to identify a channel pair selection provided for communication between the communication device and a base station. Thereafter, the controller may adjust at least one of the edge of the programmable transmitter pass band, the edge of the programmable receiver pass band, and a combination thereof depending upon the channel pair selection.

Another exemplary embodiment includes a programmable duplexer of a communication device. The exemplary embodiment may include a receiver filter having a receiver input and a receiver output, the receiver filter having a programmable receiver pass band. The exemplary embodiment may further include a transmitter filter including a transmitter input and a transmitter output, where the transmitter output is coupled to the receiver input, and wherein the transmitter filter has a programmable transmitter pass band. A controller may be coupled to the receiver filter and the transmitter filter. The controller may be adapted to identify a receiver-transmitter channel pair provided for communication between a mobile terminal and a base station. The controller may be further adapted to control at least one of the programmable receiver pass band, the programmable transmitter pass band, and a combination thereof, to maintain at least a minimum transition band between the programmable receiver pass band and the programmable transmitter pass band based upon the receiver-transmitter channel pair.

Another exemplary embodiment of a duplexer includes a receiver filter. The receiver filter includes a radio frequency receiver input and a radio frequency receiver output. The receiver filter further includes a receiver pass band having a programmable receiver pass band edge. The exemplary duplexer further includes a transmitter filter. The transmitter filter includes a radio frequency transmitter input and a radio frequency transmitter output. The radio frequency transmitter output may be coupled to the radio frequency receiver input. The transmitter filter may further include a transmitter pass band having a programmable transmitter pass band edge. The duplexer may also include a controller coupled to the receiver filter and the transmitter filter. The controller may modify at least one of the programmable receiver pass band edge and the programmable transmitter pass band edge based upon selection of a channel pair of a transmit frequency band and a receiver frequency band.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 5(*a*) depicts a plot of the real part of the admittance (conductance) for a typical one-port resonator, along with the imaginary part (susceptance).

FIG. 5(*b*) depicts a plot of the real part of the admittance (conductance) and imaginary part (susceptance) for a typical one-port resonator achieved by adding a reactive element in parallel with the one-port resonator.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims. Embodiments disclosed herein relate to programmable duplexers. The frequency pass band of the duplexer is changed according to a selection of a channel-pair selection to control or maximize the transition band between the receiver path and the transmitter path. The programmable duplexer permits selections of desired pass bands without the need for multiple duplexer filters. As an additional advantage, the transmission band requirements become less sensitive to manufacturing tolerances and temperature variations.

An exemplary embodiment of a duplexer for a communication device includes a receiver path. The receiver path may include a programmable receiver filter that provides a programmable receiver pass band. In addition, the duplexer includes a transmitter path including a programmable transmitter filter that provides a programmable transmitter pass band. The programmable transmitter filter may be separated from the programmable receiver filter by a transition band, where the programmable receiver pass band has an edge adjacent to the transition band, and the programmable transmitter pass band has an edge adjacent to the transition band. A controller may be configured to identify a channel pair selection provided for communication between the communication device and a base station. Thereafter, the controller may adjust at least one of the edge of the programmable transmitter pass band, the edge of the programmable receiver pass band, or a combination thereof, depending upon the channel pair selection.

Another exemplary embodiment includes a programmable duplexer of a communication device. The exemplary embodiment may include a receiver filter including a receiver input and a receiver output, the receiver filter having a programmable receiver pass band. The exemplary embodiment may further include a transmitter filter including a transmitter input and a transmitter output, where the transmitter output is coupled to the receiver input, and wherein the transmitter filter has a programmable transmitter pass band. A controller may be coupled to the receiver filter and the transmitter filter. The controller may be adapted to identify a receiver-transmitter channel pair provided for communication between a mobile terminal and a base station. The controller may be further adapted to control at least one of the programmable receiver pass band, the programmable transmitter pass band, or a combination thereof, to maintain at least a minimum transition band between the programmable receiver pass band and the programmable transmitter pass band based upon the receiver-transmitter channel pair.

Another exemplary embodiment of a duplexer includes a receiver filter. The receiver filter includes a radio frequency receiver input and a radio frequency receiver output. The receiver filter further includes a receiver pass band having a programmable receiver pass band edge. The exemplary duplexer further includes a transmitter filter. The transmitter filter includes a radio frequency transmitter input and a radio frequency transmitter output. The radio frequency transmitter output may be coupled to the radio frequency receiver input. The transmitter filter may further include a transmitter pass band having a programmable transmitter pass band edge. The duplexer may also include a controller coupled to the receiver filter and the transmitter filter. The controller may modify at least one of the programmable receiver pass band edge and the programmable transmitter pass band edge based upon selection of a channel pair of a transmit frequency band and a receiver frequency band.

Figure 1:
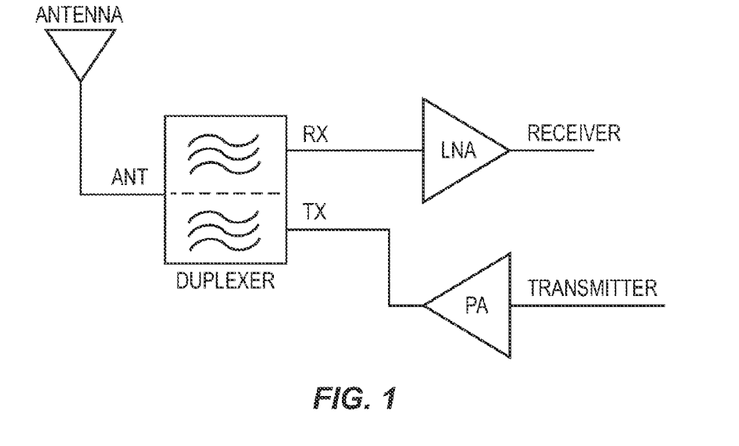
FIG. 1 depicts an example embodiment of a programmable duplexer in a radio frequency front transceiver circuit.

FIG. 1 depicts a typical duplexer structure. The duplexer includes a receive channel (RX) and a transmit channel (TX). The output of the transmit channel (TX) and the input of the receive channel (RX) are each in communication with an antenna (ANT). The output of the receive channel (RX) is in communication with a low noise amplifier (LNA), which provides an output to a receiver. The input of the transmit channel (TX) is configured to receive the output of a power amplifier (PA), which receives an input from the transmitter.

Figure 2:
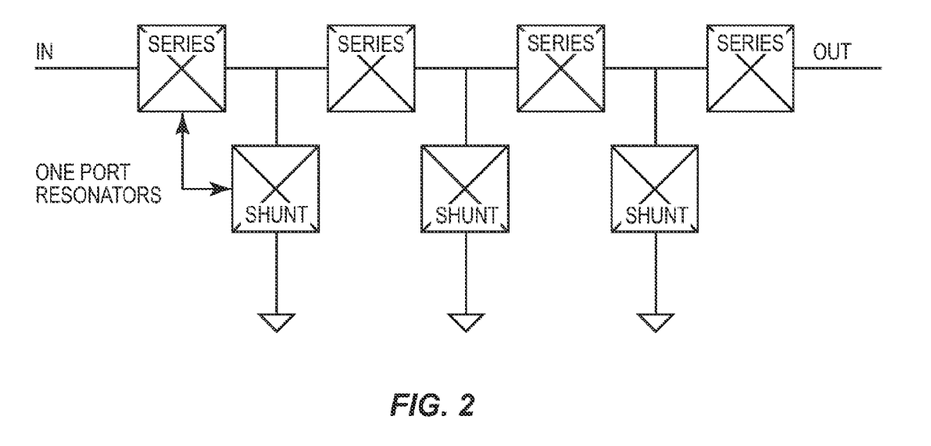
FIG. 2 depicts a ladder topology of a ladder filter topology.

In typical SAW duplexers, the receiver filters and transmitter filters each include a multiplicity of synchronous one-port resonators configured alternately in series and in shunt arrangements to form a ladder filter or ladder topology. FIG. 2 depicts an example ladder filter or ladder topology for either a receiver filter or a transmitter filter. In such a configuration, the frequency of the lower edge of each pass band is determined by the resonant frequencies, $f_R$, of the shunt resonators.

The transmit signal and receiver signal are broadcast and received respectively within different frequency bands. The duplexer, therefore, is required to perform five primary functions. First, the duplexer permits TX-band signals to travel efficiently and with low insertion loss from the power amplifier (PA) to the antenna (ANT). Second, the duplexer allows RX-band signals to travel efficiently and with low insertion loss from the antenna (ANT) to the low noise amplifier (LNA). Third, the duplexer efficiently blocks TX-band signals at the antenna (ANT) port from getting through to the low noise amplifier (LNA). Fourth, the duplexer efficiently blocks spurious RX-band signals from the power amplifier (PA) from reaching the antenna (ANT) port. Fifth, the duplexer efficiently blocks any signals in either band from passing between the TX port and the RX port.

Figure 3:
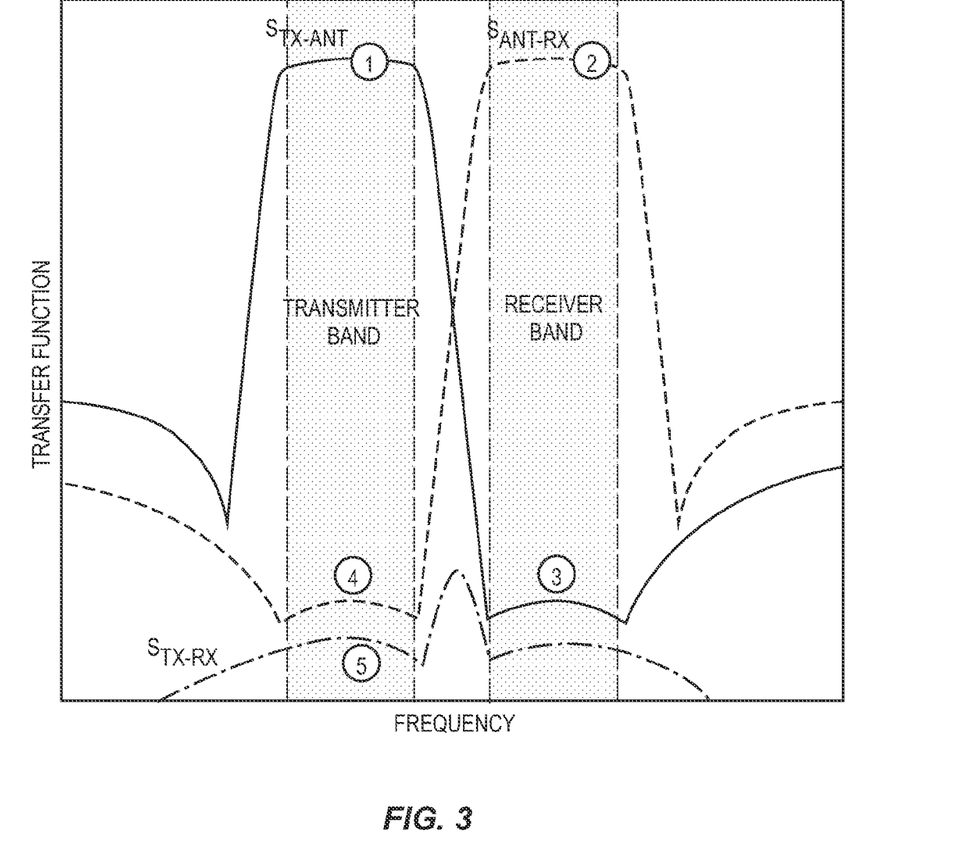
FIG. 3 depicts a transfer function of a duplexer.

As depicted in FIG. 3, the frequency of the upper edge is determined by the anti-resonant frequencies, $f_A$, of the series resonators. There are five basic characteristics of a duplexer that should be considered. One characteristic of a duplexer is that there is (1) low transmitter to antenna (TX-ANT) attenuation in the transmitter band. Another characteristic of a duplexer is that there is (2) low antenna to receiver (ANT-RX) attenuation in the receiver band. Still another characteristic is that there is (3) high transmitter to antenna (TX-ANT) attenuation in the receiver band and (4) high antenna to receiver (ANT-RX) attenuation in the transmitter band. Furthermore, there is (5) high transmitter-receiver isolation between the receiver band and the transmitter band.

The resonant and anti-resonant frequencies of the one-port resonators are determined mostly by fixed fabrication parameters, such as mask layout, metal thickness, and photolithographic bias. However, the resonant and anti-resonant frequencies may be influenced by the addition of reactive elements in series or parallel with the resonators. Example reactive elements include capacitors and inductors.

Figure 4A:
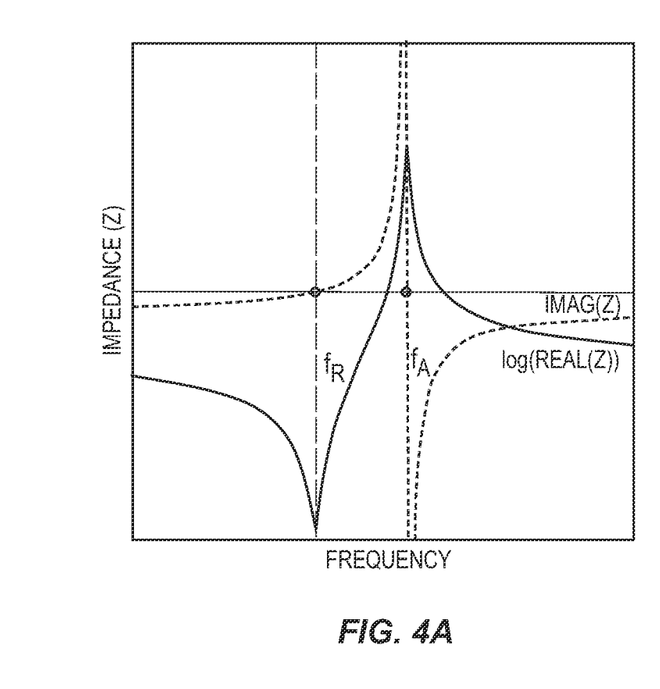
FIG. 4(a) depicts a plot of the impedance of a typical one-port resonator, broken into its real part (resistance) and imaginary part (reactance).
Figure 4B:
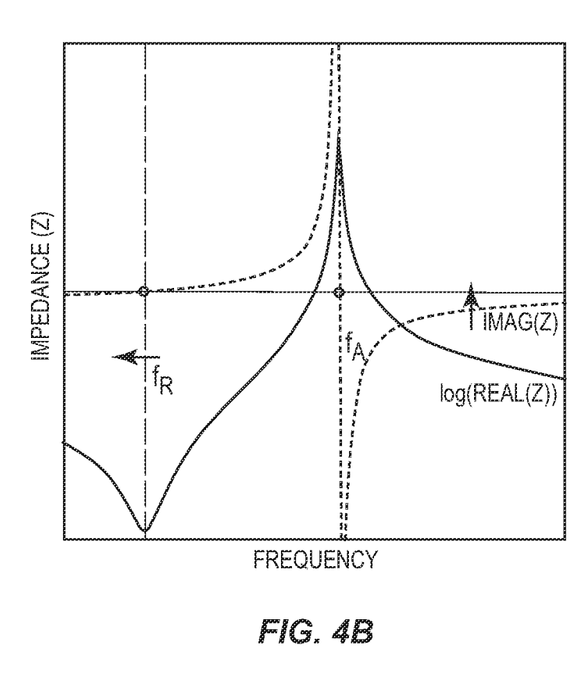
FIG. 4(b) depicts a plot of the impedance of a typical one-port resonator having a series reactive component.

FIG. 4(a) depicts a plot of the impedance of a typical one-port resonator, broken into its real part (resistance) and imaginary part (reactance). The resonant and anti-resonant frequencies correspond to the points where the reactance equals zero. As depicted in FIG. 4(b), adding a reactive element shifts the resonant frequency, $f_R$, response without substantial impact to the anti-resonant, $f_A$, response. The reactive element may be an inductor or a capacitor added in series with the resonator. The reactive element may cause the imaginary part to shift up or down on the plot, which causes a left or right shift in the zero crossing at the resonant frequency. The shifting of the zero crossing thereby changes the resonant frequency of the resonator. At the anti-resonant frequency, however, the slope of the resonator reactance is extremely steep so very little left or right movement of the zero crossing will result.

Figure 5A:
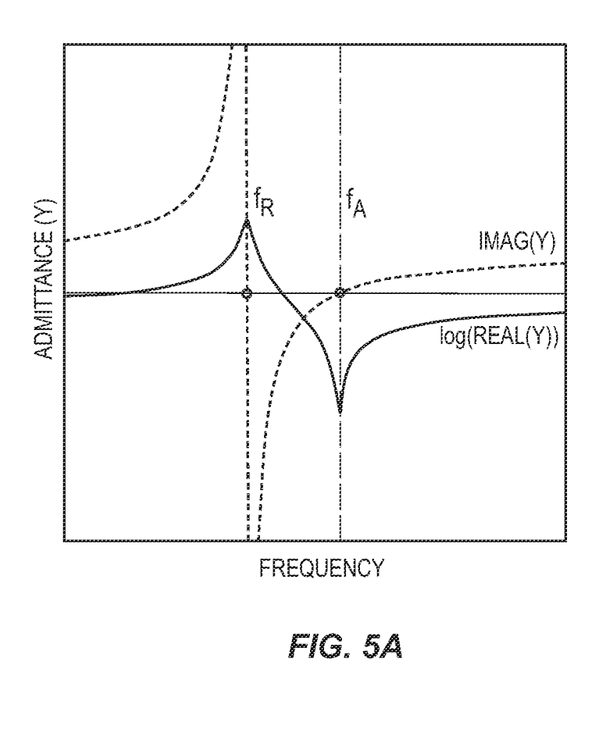
Figure 5B:
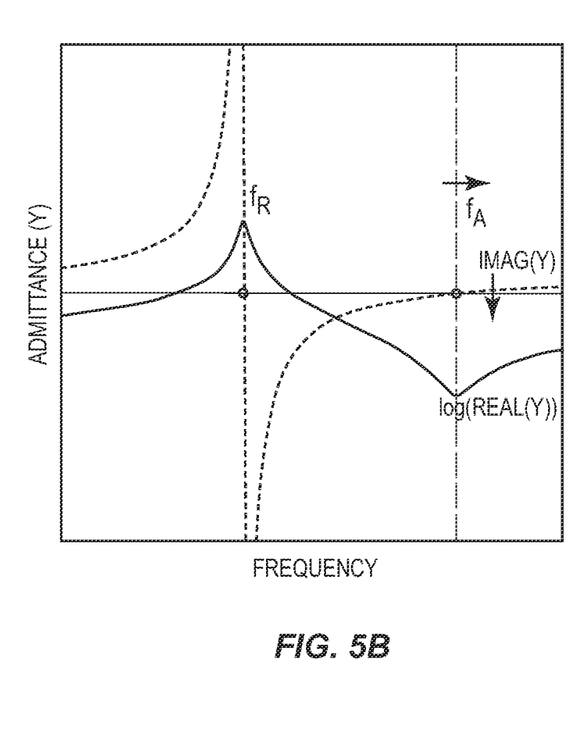

In contrast, FIG. 5(a) depicts a plot of the real part of the admittance (conductance) for a typical resonator, along with the imaginary part (susceptance). Again, the resonant and anti-resonant frequencies correspond to the zero crossings of the imaginary curve. In this case, the imaginary part may be shifted up or down on the plot by adding a reactive element in parallel with the resonator. As further depicted in FIG. 5(b), the addition of a parallel reactive element results in a left or right shift in the anti-resonant zero crossing and a corresponding shift in the anti-resonant frequency of the resonator. Because the slope is very steep at the resonant frequency, an up or down shift in the susceptance has almost no effect on the frequency of this zero crossing. Accordingly, by adding a reactive element in series with a resonator, the resonant frequency of the resonator may be shifted up or down. Likewise, a resonator's anti-resonant frequency may be shifted up or down by adding a reactive element in parallel.

Figure 6:
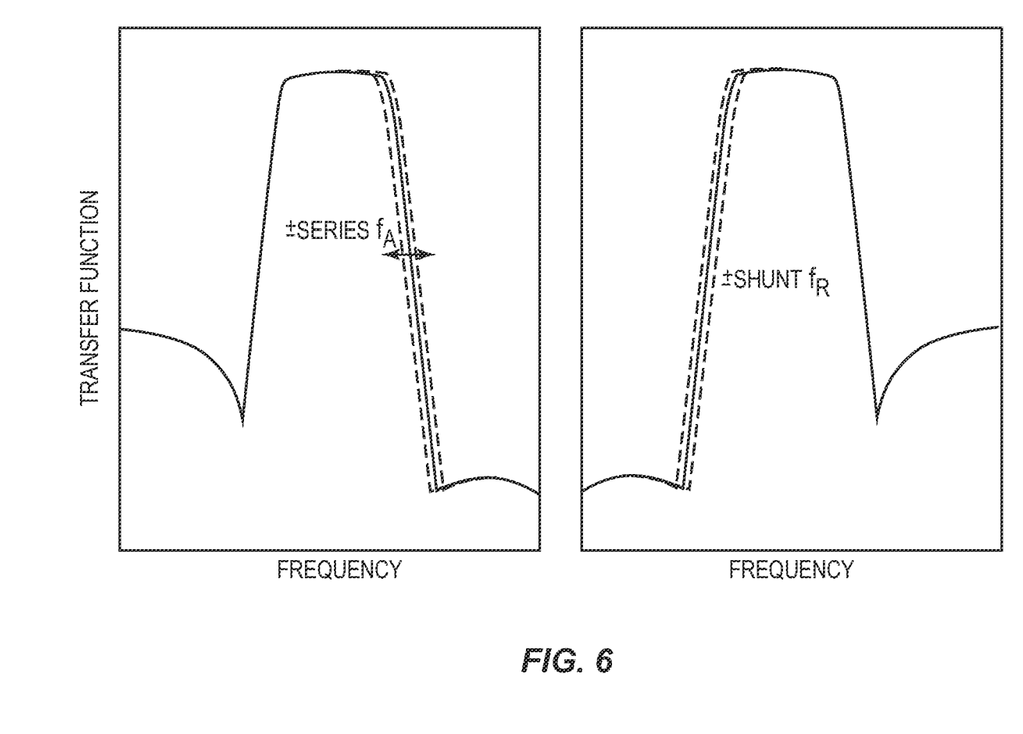
FIG. 6 depicts a frequency response of an example duplexer having a programmable transmitter filter and a programmable receiver filter.

As mentioned previously, the lower pass band edge of a ladder filter is determined primarily by the resonant frequencies of the shunt resonators, while the upper pass band edge is determined by the anti-resonant frequencies of the series resonators. Thus, as depicted in FIG. 6, the pass band edges of the filter can be shifted up or down slightly by judicious addition of reactive elements in series with the shunt elements, which control the lower pass band edge, or in parallel with the series elements, which control the upper pass band edge.

Figure 7:
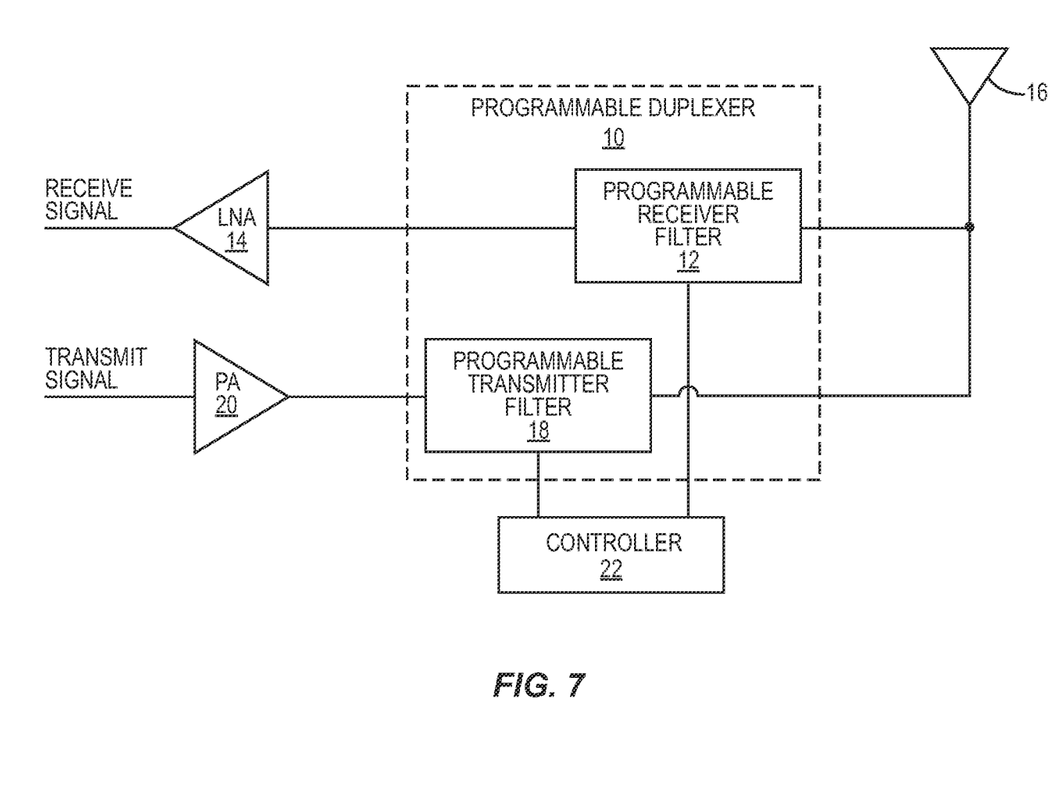
FIG. 7 depicts an example duplexer having an example programmable transmitter filter and an example programmable receiver filter

FIG. 7 depicts an example embodiment of a programmable duplexer 10. The programmable duplexer 10 may include a programmable transmitter filter 18. The programmable transmitter filter 18 may be coupled to an output of a power amplifier output 20 and an antenna 16. The programmable duplexer 10 may further include a programmable receiver filter 12. The programmable receiver filter 12 may be coupled to a low noise amplifier 14 and the antenna 16. A controller 22 is coupled to the programmable receiver filter 12 and the programmable transmitter filter 18. The programmable transmitter filter 18 may include a programmable pass band. The programmable receiver filter 12 may also include a programmable pass band. The pass band of the programmable receiver filter 12 may be separated from the pass band of the programmable transmitter filter 18 by a transition band.

Figure 8:
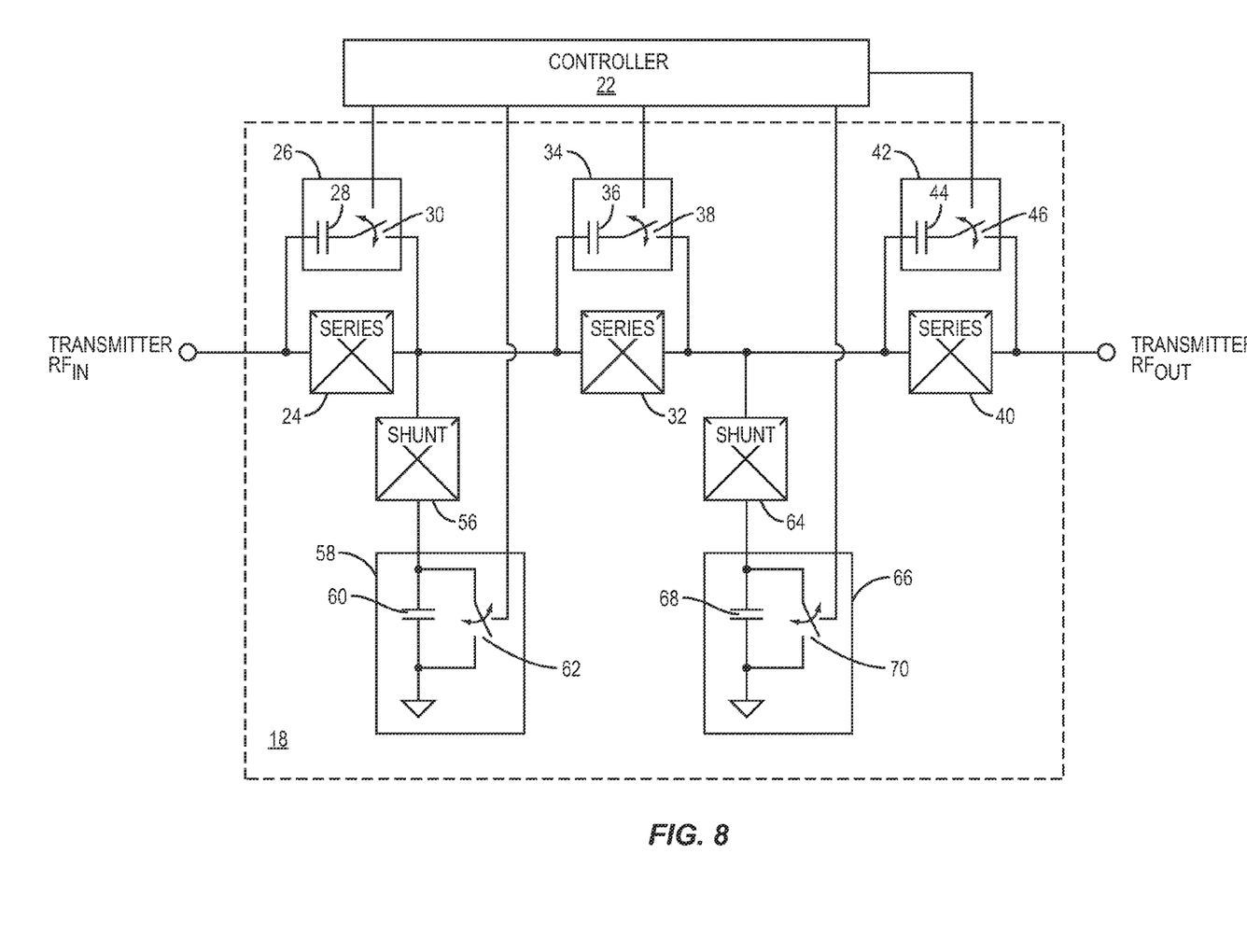
FIG. 8 depicts an example transmitter path having an example programmable transmitter filter, where the programmable transmitter filter includes arrays of resonant devices.

FIG. 8 depicts an example transmitter path having an example of the programmable transmitter filter 18. The programmable transmitter filter 18 may include a plurality of one-port resonators arranged in series and in parallel to form a ladder filter. Switch controlled series and parallel resonant circuits are provided in parallel and in series with at least one of the plurality of resonators to provide a programmable pass band.

As further depicted in FIG. 8, the first series one-port resonator 24 further includes a first switchable reactive element 26 in parallel with the first series resonator. The first switchable reactive element 26 may include a capacitor 28 in series with a first switch 30. The first switch 30 is coupled to the controller 22. The first switch 30 has an enable state and a disable state. When the first switch 30 is enabled, the first switch 30 is closed and the capacitor 28 is in parallel with the first series one-port resonator 24. When the first switch 30 is in the disable state, the first switch 30 is open and capacitor 28 is not active in the circuit.

The second series one-port resonator 32 is coupled in series with the first series one-port resonator 24. The second series one-port resonator 32 further includes a second switchable reactive element 34 in parallel with the second series one-port resonator 32. The second series one-port resonator 32 is in parallel with a second switchable reactive element 34. The second switchable reactive element 34 may include a reactive device 36 in series with a second switch 38 coupled to the controller 22. The reactive device 36 may be either a capacitor or an inductor. As illustrated in FIG. 8, the reactive device 36 is a capacitor. The second switch 38 has an enable state and a disable state. When the second switch 38 is enabled, the second switch 38 is closed and reactive device 36 is in parallel with the second series one-port resonator 32. When the second switch 38 is in the disable state, the second switch 38 is open and the reactive device 36 is not active in the circuit.

The second series one-port resonator 32 may be coupled in series with a third series one-port resonator 40. The third series one-port resonator 40 further includes a third switchable reactive element 42 in parallel with the third series one-port resonator 40. The third series one-port resonator 40 is in parallel with a third switchable reactive element 42. The third switchable reactive element 42 may include a reactive device 44 in series with a third switch 46 that is coupled to the controller 22. The reactive device 44 may be either a capacitor or an inductor. As illustrated in FIG. 8, the reactive device 44 is a capacitor. The third switch 46 has an enable state and a disable state. When the third switch 46 is enabled, the third switch 46 is closed and reactive device 44 is in parallel with the third series one-port resonator 40. Otherwise, when the third switch 46 is in the disable state, the third switch 46 is open and the reactive device 44 is not active in the circuit.

The example programmable transmitter filter 18 of FIG. 8 may further include a first shunt one-port resonator 56. The first shunt one-port resonator 56 may be in series with a first switchable series reactive device 58, which is coupled to ground. The first shunt one-port resonator 56 may be further coupled to the first series one-port resonator 24 and the second series one-port resonator 32. The first switchable series reactive device 58 may include a reactive device 60 in parallel with a fourth switch 62. When the fourth switch 62 is enabled by the controller 22, the fourth switch 62 is closed and the reactive device 60 is bypassed. When the fourth switch 62 is disabled, the fourth switch 62 is open and the reactive device 60 is operative in the circuit.

The programmable transmitter filter 18 of FIG. 8 may further include a second shunt one-port resonator 64. The second shunt one-port resonator 64 may be in series with a second switchable series reactive device 66, which is coupled to ground. The second shunt one-port resonator 64 may be further coupled to the second series one-port resonator 32 and the third series one-port resonator 40. The second switchable series reactive device 66 may include a reactive device 68 in parallel with a fifth switch 70. When the fifth switch 70 is enabled by the controller 22, the fifth switch 70 is closed and the reactive device 68 is bypassed. When the fifth switch 70 is disabled, the fifth switch 70 is open and the reactive device 68 is operative in the circuit. Although the reactive devices depicted in FIG. 8 are capacitors, this is by way of illustration and not by limitation. Furthermore, while FIG. 8 describes a programmable transmitter filter 18, the same circuit topology may be used to form a programmable receiver filter 12. Although not shown in FIG. 8, additional series one-port resonators and shunt one-port resonators may be added to increase the order of the ladder filter.

Figure 9:
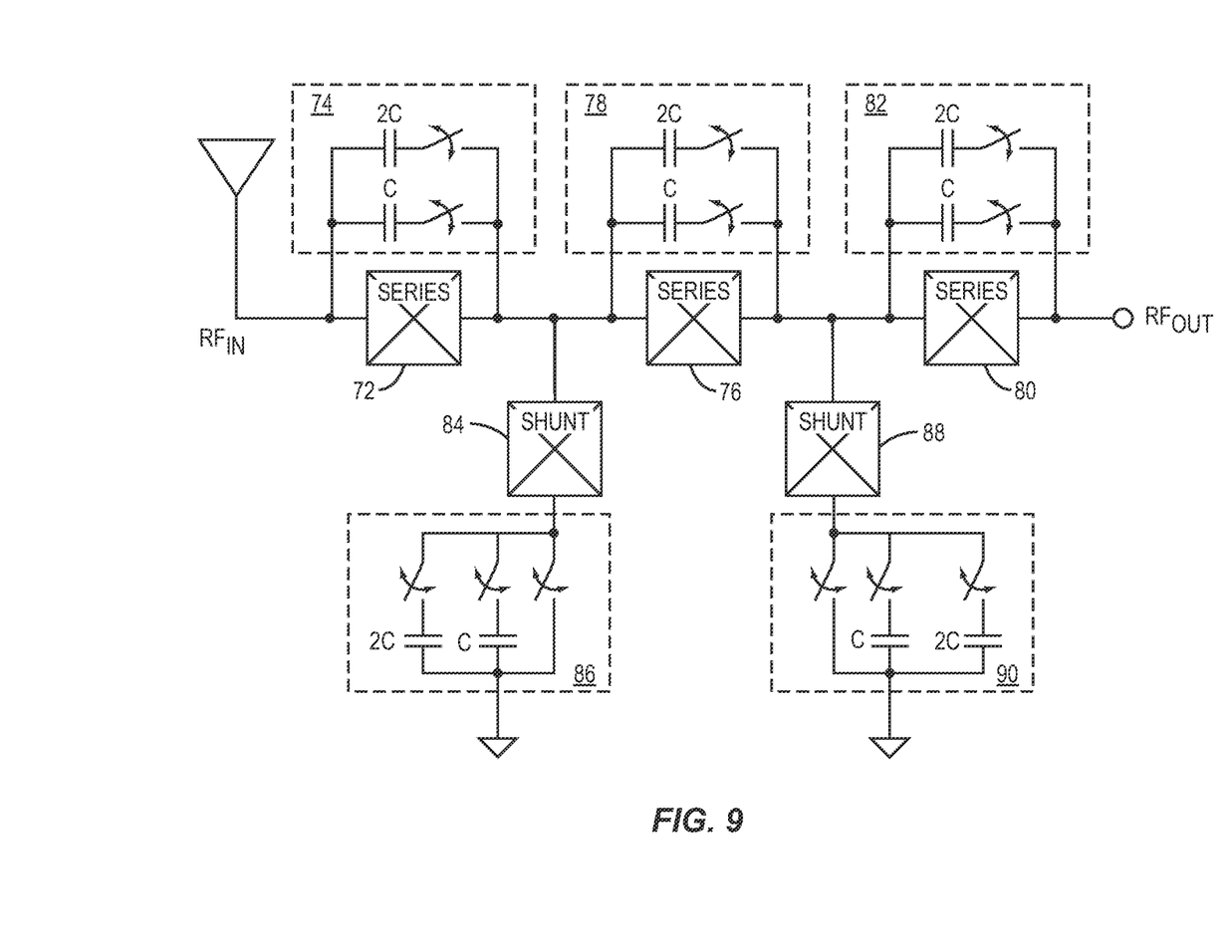
FIG. 9 depicts an example programmable receiver filter with arrays of reactive devices in parallel with series one-port resonators.

As further depicted in FIG. 9, an example embodiment of the programmable receiver filter 12 may further include arrays of reactive devices in parallel with series one-port resonators. The capacitors may be thermally weighted or binary encoded capacitor arrays. As an example, a first series one-port resonator 72 may be in parallel with a first capacitor array 74. A second series one-port resonator 76 may be in parallel with a second capacitor array 78. A third series one-port resonator 80 may be in parallel with a third capacitor array 82. Additionally, a first shunt one-port resonator 84 may be placed in series with a fourth capacitor array 86. A second shunt one-port resonator 88 may be placed in series with a fifth capacitor array 90.

Although not shown, controller 22 may be configured to control each of the capacitor arrays. For example, the first capacitor array 74 and second capacitor array 78 may be coupled to a controller 22 (not shown), which controls the first capacitor arrays 74 and the second capacitor array 78, respectively. Based upon a channel-pair selection, the controller 22 configures each respective capacitor to maximize the transition band between the receiver channel and the transmit channel.

Figure 10:
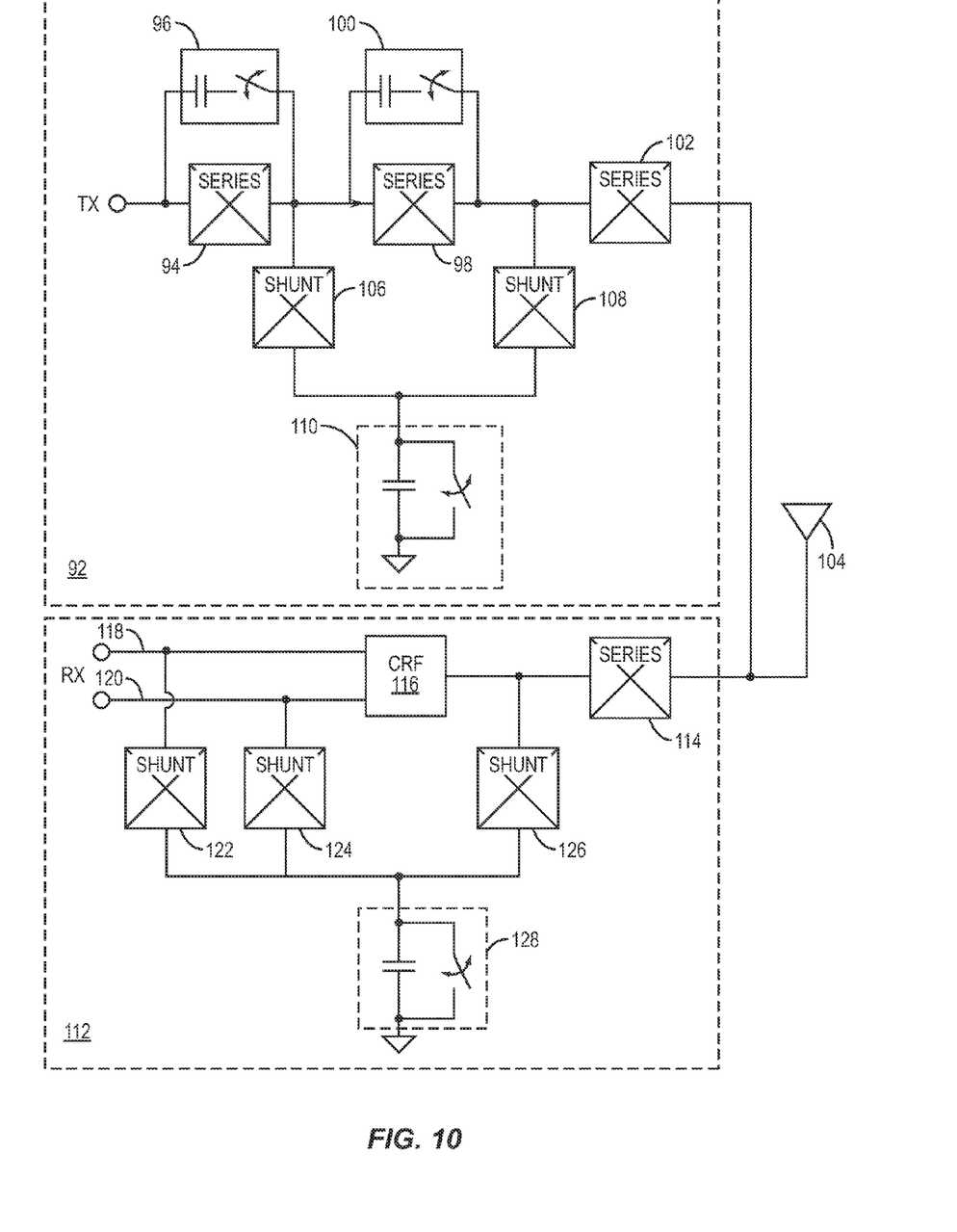
FIG. 10 depicts an example programmable duplexer that provides a balanced differential output to a differential receiver input.

FIG. 10 depicts an example programmable duplexer that provides a balanced differential output to a differential receiver input. Illustratively, FIG. 10 depicts a programmable duplexer 10 configured to provide a differential receiver output signal, and a programmable transmitter filter at the antenna. The programmable transmitter filter 92 includes a ladder filter of one-port resonators.

A first series one-port resonator 94 is coupled in parallel with a first switchable reactive element 96. A second series one-port resonator 98 is coupled in parallel with the second switchable reactive element 100. A third series one-port resonator 102 is coupled between the second series one-port resonator 98 and the antenna 104.

The first shunt one-port resonator 106 and the second shunt one-port resonator 108 are coupled in series with the third switchable reactive component 110.

FIG. 10 further depicts a programmable receiver filter 112. The programmable receiver filter 112 includes a first one-port resonator 114 coupled in series with a coupled resonator filter (CRF) 116. The coupled resonator filter 116 is configured to receive a single ended input and provide a balanced differential output to the receiver, RX. The differential output may include a first receiver output 118 and a second receiver output 120. The programmable receiver filter 112 may further include a first shunt one-port resonator 122, a second shunt one-port resonator 124, and a third shunt one-port resonator 126 coupled in parallel.

The first shunt one-port resonator 122, the second shunt one-port resonator 124, and the third shunt one-port resonator 126 coupled in parallel may be coupled in series with a fourth switchable reactive element 128.

The output of the coupled resonator filter 116 is in cooperative function with the first shunt one-port resonator 122 and the second shunt one-port resonator 124 to form the first receiver output 118 and the second receiver output 120, respectively.

Figure 11:
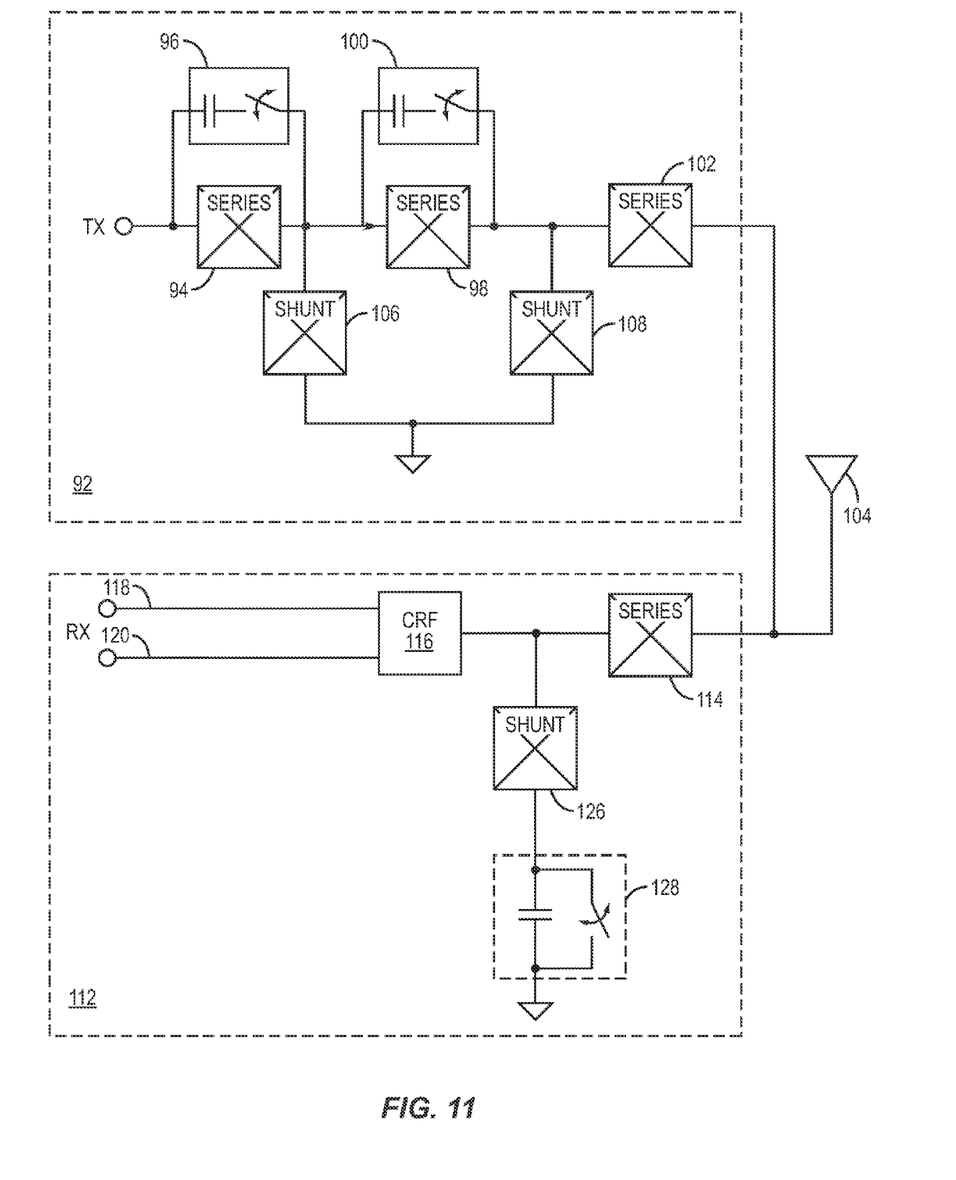
FIG. 11 depicts an alternative example programmable duplexer that provides a balanced differential output to a differential input.

In some embodiments, the third switchable reactive component 110, the first shunt one-port resonator 122, and the second shunt one-port resonator 124 may be eliminated to form a simpler system, as depicted in FIG. 11.

Figure 12:
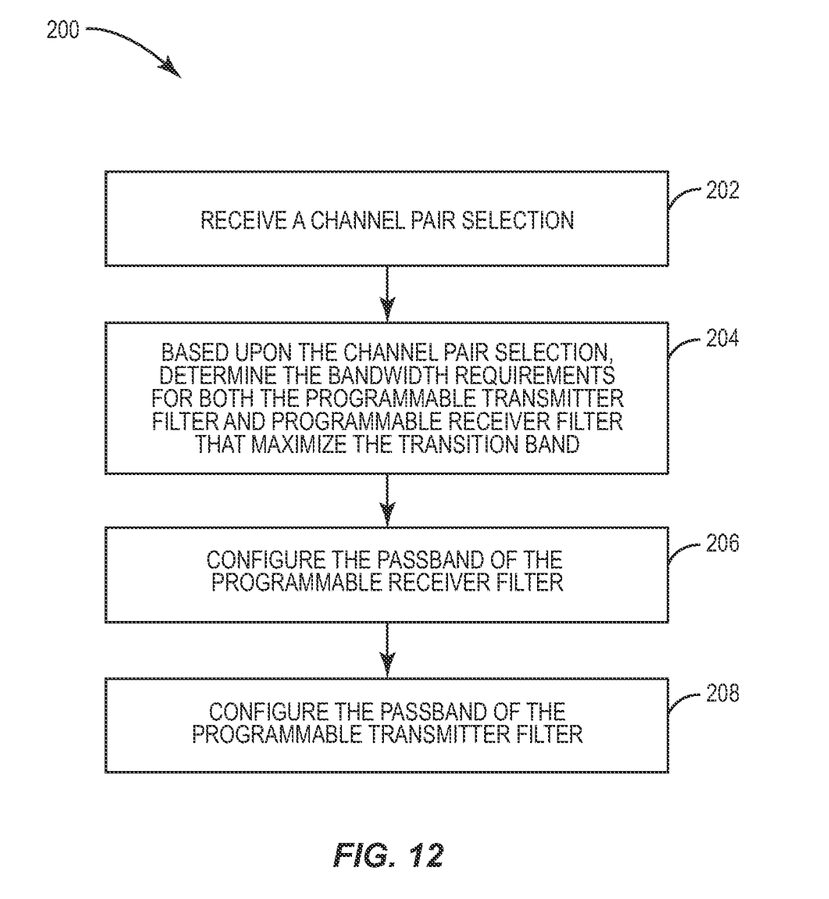
FIG. 12 depicts an operation for controlling the pass band of the programmable receiver filter and programmable transmitter filter.

FIG. 12 depicts an operation for controlling the pass band of the programmable receiver filter and programmable transmitter filter. As discussed before, the controller 22 may be configured to identify a channel pair selection provided for communication between the communication device and a base station. Based upon the identified channel pair selection, the controller 22 may be further configured to adjust at least one of the edge of the programmable transmitter pass band, the edge of the programmable receiver pass band, and a combination thereof based upon the identified channel pair selection.

As an example operation 200, depicted in FIG. 12, the controller 22 receives a channel pair selection, (act 202). Based upon the channel pair selection, the controller 22 determines the bandwidth requirements for both the programmable transmitter filter and the programmable receiver filter that maximize the transition band, (act 204). Thereafter, based upon the bandwidth requirements of the transmitter filter, the controller 22 configures the switchable reactive elements of the transmitter filter to provide the appropriate pass band by adjusting at least one edge of the programmable transmitter pass band, (act 206). The controller 22 further configures the switchable reactive elements of the receiver filter to provide the appropriate pass band by adjusting at least one edge of the programmable transmitter pass band, (act 208).

Those skilled in the art will recognize improvements and modifications to the embodiments of the present disclosure. All such improvements and modifications are considered within the scope of the concepts disclosed herein and the claims that follow.

What is claimed is:

1. A communication device comprising:
 a duplexer, the duplexer comprising:
 a receiver path including a programmable receiver filter that provides a programmable receiver pass band;
 a transmitter path including a programmable transmitter filter that provides a programmable transmitter pass band, wherein the programmable receiver filter is separated from the programmable transmitter filter by a transition band, wherein the programmable receiver pass band has an edge adjacent to the transition band, and the programmable transmitter pass band has an edge adjacent to the transition band; and a controller configured to identify a channel pair selection provided for communication between the communication device and a base station, the controller further configured to adjust at least one of the edge of the programmable transmitter pass band, the edge of the programmable receiver pass band, and a combination thereof based upon the channel pair selection.

2. The communication device comprising the duplexer of claim 1 wherein the programmable transmitter filter includes a plurality of one-port resonators arranged in series and in shunt to form a ladder filter, and a switchable reactance, wherein the switchable reactance is coupled in parallel or in series with at least one of the plurality of one-port resonators.

3. The communication device comprising the duplexer of claim 1 wherein the programmable receiver filter includes a one-port resonator arranged in series or shunt with a coupled resonator filter, and at least one switchable reactance, wherein the at least one switchable reactance is coupled in parallel or in series with the one-port resonator.

4. The communication device comprising the duplexer of claim 3 wherein the coupled resonator filter produces a differential output, and wherein the coupled resonator filter provides the differential output to a differential receiver input.

5. A communication device comprising:
a programmable duplexer, the duplexer comprising:
a receiver filter including a receiver input and a receiver output, the receiver filter having a programmable receiver pass band;
a transmitter filter including a transmitter input and a transmitter output, wherein the transmitter output is coupled to the receiver input, and wherein the transmitter filter has a programmable transmitter pass band; and
a controller coupled to the receiver filter and the transmitter filter, the controller adapted to:
identify a receiver-transmitter channel pair provided for communication between a mobile terminal and a base station; and
adjust at least one of the programmable receiver pass band, the programmable transmitter pass band, and a combination thereof, to maintain at least a minimum transition band between the programmable receiver pass band and the programmable transmitter pass band based upon the receiver-transmitter channel pair.

6. The communication device comprising the programmable duplexer of claim 5 further comprising an antenna coupled to the receiver input and the transmitter input.

7. The communication device comprising the programmable duplexer of claim 5 wherein the transmitter filter includes a plurality of one-port resonators arranged in series and in shunt to form a ladder filter, and a switchable reactance, wherein the switchable reactance is coupled in parallel or in series with one of the plurality of one-port resonators.

8. The communication device comprising the programmable duplexer of claim 5 wherein the receiver filter includes a one-port resonator arranged in series or shunt with a coupled resonator filter, and at least one switchable reactance, wherein the at least one switchable reactance is coupled in parallel or in series with the one-port resonator.

9. A communication device comprising:
a duplexer, the duplexer comprising:
a receiver filter including a radio frequency receiver input and a radio frequency receiver output, wherein the receiver filter includes a receiver pass band having a programmable receiver pass band edge;
a transmitter filter including a radio frequency transmitter input and a radio frequency transmitter output, wherein the radio frequency transmitter output is coupled to the radio frequency receiver input, and wherein the transmitter filter includes a transmitter pass band having a programmable transmitter pass band edge; and
a controller coupled to the receiver filter and the transmitter filter, wherein the controller is configured to adjust at least one of the programmable receiver pass band edge and the programmable transmitter pass band edge based upon selection of a channel pair of a transmit frequency band and a receiver frequency band.

10. The communication device comprising the duplexer of claim 9 wherein the radio frequency receiver output is a differential radio frequency receiver output.

11. The communication device comprising the duplexer of claim 9 wherein the receiver filter includes:
a series one-port resonator having a first node and a second node, wherein the first node of the series one-port resonator is coupled to the radio frequency receiver input;
a coupled resonator filter having an input node, a first output node and a second output node, wherein the input node of the coupled resonator filter is in communication with the second node of the series one-port resonator;
a first shunt one-port resonator having a first node and a second node, wherein the first node of the first shunt one-port resonator is coupled to the input node of the coupled resonator filter;
a second shunt one-port resonator having a first node and a second node, wherein the first node of the second shunt one-port resonator is coupled to the first output node of the coupled resonator filter; and
a third shunt one-port resonator having a first node and a second node, wherein the first node of the third shunt one-port resonator is coupled to the second output node of the coupled resonator filter.

12. The communication device comprising the duplexer of claim 11 wherein a switchable reactance circuit includes a first node and a second node, wherein the first node of the switchable reactance circuit is coupled to the second node of the first shunt one-port resonator, the second node of the second shunt one-port resonator, and the second node of the third shunt one-port resonator.

13. The communication device comprising the duplexer of claim 12, wherein the controller is configured to modify the switchable reactance circuit to adjust the programmable receiver pass band edge.

14. The communication device comprising the duplexer of claim 9 wherein the transmitter filter includes:
a ladder filter including a first series one-port resonator, a second series one-port resonator, a third series one-port resonator, a first shunt one-port resonator, and a second shunt one-port resonator; and
wherein the first series one-port resonator is coupled in parallel with a first switchable reactance circuit.

15. The communication device comprising the duplexer of claim 14 wherein the second series one-port resonator is coupled in parallel with a second switchable reactance circuit.

16. The communication device comprising the duplexer of claim 15 wherein the first shunt one-port resonator is coupled in series with a third switchable reactance circuit.

17. The communication device comprising the duplexer of claim 16 wherein the second shunt one-port resonator is also coupled in series with the third switchable reactance circuit.

18. The communication device comprising the duplexer of claim 2 wherein the switchable reactance comprises a capacitor.

19. The communication device comprising the programmable duplexer of claim 7 wherein the switchable reactance comprises a capacitor.

20. The communication device comprising the duplexer of claim 12 wherein the switchable reactance circuit comprises a capacitor.

\* \* \* \* \*